(12) United States Patent
Pascarella et al.

(10) Patent No.: US 9,594,713 B2
(45) Date of Patent: Mar. 14, 2017

(54) BRIDGING STRONGLY ORDERED WRITE TRANSACTIONS TO DEVICES IN WEAKLY ORDERED DOMAINS, AND RELATED APPARATUSES, METHODS, AND COMPUTER-READABLE MEDIA

(71) Applicant: QUALCOMM Incorporated, San Diego, CA (US)

(72) Inventors: Randall John Pascarella, Round Rock, TX (US); Jaya Prakash Subramaniam Ganasan, Youngsville, NC (US); Thuong Quang Truong, Austin, TX (US); Gurushankar Rajamani, Sunnyvale, CA (US); Joseph Gerald McDonald, Raleigh, NC (US); Thomas Philip Speier, Wake Forest, NC (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 14/484,624

(22) Filed: Sep. 12, 2014

(65) Prior Publication Data
US 2016/0077991 A1    Mar. 17, 2016

(51) Int. Cl.
*G06F 13/40* (2006.01)
*G06F 13/16* (2006.01)
*G06F 13/42* (2006.01)

(52) U.S. Cl.
CPC ...... *G06F 13/4013* (2013.01); *G06F 13/1621* (2013.01); *G06F 13/4027* (2013.01); *G06F 13/4059* (2013.01); *G06F 13/4221* (2013.01)

(58) Field of Classification Search
CPC .... G06F 9/3836; G06F 9/3842; G06F 9/3855; G06F 13/161; G06F 13/1615;
(Continued)

(56) References Cited

U.S. PATENT DOCUMENTS 5,751,986 A * 5/1998 Fetterman ............. G06F 9/3834
711/146
5,835,741 A * 11/1998 Elkhoury ............ G06F 13/4059
710/310

(Continued)

OTHER PUBLICATIONS

International Search Report and Written Opinion for PCT/US2015/047727, mailed Jan. 4, 2016, 10 pages.

*Primary Examiner* — Thomas J Cleary
(74) *Attorney, Agent, or Firm* — Withrow & Terranova, PLLC

(57) ABSTRACT

Bridging strongly ordered write transactions to devices in weakly ordered domains, and related apparatuses, methods, and computer-readable media are disclosed. In one aspect, a host bridge device is configured to receive strongly ordered write transactions from one or more strongly ordered producer devices. The host bridge device issues the strongly ordered write transactions to one or more consumer devices within a weakly ordered domain. The host bridge device detects a first write transaction that is not accepted by a first consumer device of the one or more consumer devices. For each of one or more write transactions issued subsequent to the first write transaction and accepted by a respective consumer device, the host bridge device sends a cancellation message to the respective consumer device. The host bridge device replays the first write transaction and the one or more write transactions that were issued subsequent to the first write transaction.

20 Claims, 8 Drawing Sheets

(58) Field of Classification Search
CPC ............. G06F 13/1621; G06F 13/1626; G06F 13/4004; G06F 13/4009; G06F 13/4013; G06F 13/4027; G06F 13/4059; G06F 13/4221; G06F 13/4234
See application file for complete search history.

(56) References Cited

U.S. PATENT DOCUMENTS

| | | | |
|---|---|---|---|
| 6,038,646 A * | 3/2000 | Sproull | G06F 9/30087 711/154 |
| 6,088,771 A * | 7/2000 | Steely, Jr. | G06F 8/458 709/213 |
| 6,175,889 B1 | 1/2001 | Olarig | |
| 6,370,632 B1 * | 4/2002 | Kikuta | G06F 12/08 345/619 |
| 6,405,276 B1 * | 6/2002 | Chen | G06F 9/52 707/999.008 |
| 6,963,967 B1 * | 11/2005 | Guthrie | G06F 9/3004 712/225 |
| 7,308,522 B2 | 12/2007 | Heynemann et al. | |
| 7,610,458 B2 | 10/2009 | Arimilli et al. | |
| 8,019,944 B1 * | 9/2011 | Favor | G06F 12/0831 711/118 |
| 8,468,278 B2 | 6/2013 | Radhakrishnan et al. | |
| 2003/0126336 A1 * | 7/2003 | Creta | G06F 13/4059 710/305 |
| 2006/0218335 A1 * | 9/2006 | Hofmann | G06F 13/1621 710/316 |
| 2006/0218358 A1 | 9/2006 | Hofmann et al. | |
| 2007/0067549 A1 * | 3/2007 | Gehman | H04L 12/4625 710/315 |
| 2007/0130372 A1 * | 6/2007 | Irish | G06F 13/12 710/5 |
| 2007/0214298 A1 | 9/2007 | Sullivan, Jr. et al. | |
| 2008/0320185 A1 * | 12/2008 | Shirase | G06F 13/1642 710/57 |
| 2010/0199048 A1 * | 8/2010 | Cypher | G06F 12/0817 711/141 |
| 2011/0055439 A1 * | 3/2011 | Chen | G06F 13/4027 710/57 |
| 2011/0185102 A1 * | 7/2011 | Deogharia | G06F 13/4059 710/309 |
| 2012/0102293 A1 | 4/2012 | Negishi et al. | |
| 2013/0042038 A1 * | 2/2013 | Byrne | G06F 13/362 710/113 |
| 2013/0151799 A1 | 6/2013 | Panavich et al. | |
| 2014/0181349 A1 * | 6/2014 | Balkan | G06F 13/4027 710/310 |
| 2015/0149673 A1 | 5/2015 | Balkan et al. | |

* cited by examiner

BRIDGING STRONGLY ORDERED WRITE TRANSACTIONS TO DEVICES IN WEAKLY ORDERED DOMAINS, AND RELATED APPARATUSES, METHODS, AND COMPUTER-READABLE MEDIA

BACKGROUND

I. Field of the Disclosure

The technology of the disclosure relates generally to pipelining posted write transactions over bus interconnects in processor-based computer systems.

II. Background

Modern processor-based computer systems, such as those containing Peripheral Component Interconnect (PCI)-based interconnects, often include one or more peripheral devices that may issue and/or receive a series of write transactions. Such devices may be generally characterized as belonging to a "strongly ordered" domain or a "weakly ordered" domain. Devices in a strongly ordered domain operate under a specification providing that an ordering relationship is maintained among all write transactions. The ordering relationship provides that the order in which the write transactions are completed at a consumer device is the same as the order in which the write transactions were sent by a producer device. In contrast, a series of write transactions in a weakly ordered domain do not have any inherent order (absent a special circumstance, such as an address overlap between two transactions). Thus, in a weakly ordered domain, the order in which the write transactions in the series arrive at a consumer device is not necessarily the same as the order in which the write transactions were sent.

When a producer device in a strongly ordered domain (i.e., a "strongly ordered device") sends a series of write transactions to a consumer device in a weakly ordered domain (i.e., a "weakly ordered domain"), it is important that all write transactions are seen by the consumer device before the consumer device is notified that the series of write transactions are ready for consumption. However, because the order of arrival of the write transactions is not guaranteed in a weakly ordered domain, the write transactions may be seen by the consumer device out of their original order, which may be problematic in some circumstances. For example, a consumer device may receive a notification that the write transactions are ready for consumption before all write transactions in the series have been completed. This may result in system instability due to incomplete or corrupted data. Accordingly, a mechanism for providing a serialized ordering relationship for the write transactions as they pass to the weakly ordered domain is necessary.

One approach known in the art addresses this requirement by issuing write transactions one at a time, and waiting for completion of a previous write transaction before sending out a next write transaction. However, this approach may result in unacceptably long data transfer times, which may negatively affect system performance. Another known approach provides a centralized system arbiter configured to provide pipelining of write transactions by detecting a retry of a write transaction, and further configured to retry all subsequent write transactions. Under some approaches, a centralized system arbiter may itself be responsible for re-issuing write transactions in order on behalf of the receiving device. While the centralized system arbiter may ensure a serialized ordering relationship among the write transactions, it may not scale well in larger computer systems requiring multiple distributed arbiters that may need to communicate synchronously.

SUMMARY OF THE DISCLOSURE

Aspects disclosed in the detailed description include bridging strongly ordered write transactions to devices in weakly ordered domains. Related apparatuses, methods, and computer-readable media are also disclosed. In this regard, an apparatus comprising a host bridge device is provided. The host bridge device is configured to receive a plurality of strongly ordered write transactions from one or more strongly ordered producer devices. The host bridge device is further configured to issue the plurality of strongly ordered write transactions to one or more consumer devices within a weakly ordered domain. The host bridge device is also configured to detect a first write transaction of the plurality of strongly ordered write transactions that is not accepted by a first consumer device of the one or more consumer devices. The host bridge device is additionally configured to, for each of one or more write transactions issued subsequent to the first write transaction and accepted by a respective consumer device of the one or more consumer devices, send a cancellation message to the respective consumer device. The host bridge device is further configured to replay the first write transaction and the one or more write transactions that were issued subsequent to the first write transaction.

In another aspect, an apparatus comprising a host bridge device is provided. The host bridge device comprises a means for receiving a plurality of strongly ordered write transactions from one or more strongly ordered producer devices. The host bridge device further comprises a means for issuing the plurality of strongly ordered write transactions to one or more consumer devices within a weakly ordered domain. The host bridge device also comprises a means for detecting a first write transaction of the plurality of strongly ordered write transactions that is not accepted by a first consumer device of the one or more consumer devices. The host bridge device additionally comprises a means, for each of one or more write transactions issued subsequent to the first write transaction and accepted by a respective consumer device of the one or more consumer devices, sending a cancellation message to the respective consumer device. The host bridge device further comprises a means for replaying the first write transaction and the one or more write transactions that were issued subsequent to the first write transaction.

In another aspect, a method for bridging strongly ordered write transactions into weakly ordered domains is provided. The method comprises receiving, by a host bridge device, a plurality of strongly ordered write transactions from one or more strongly ordered producer devices. The method further comprises issuing the plurality of strongly ordered write transactions to one or more consumer devices within a weakly ordered domain. The method also comprises detecting a first write transaction of the plurality of strongly ordered write transactions that is not accepted by a first consumer device of the one or more consumer devices. The method additionally comprises sending a cancellation message to the respective consumer device for each of one or more write transactions issued subsequent to the first write transaction and accepted by a respective consumer device of the one or more consumer devices. The method further comprises replaying the first write transaction and the one or more write transactions that were issued subsequent to the first write transaction.

In another aspect, a non-transitory computer-readable medium is provided, having stored thereon computer-executable instructions to cause a processor to receive a plurality of strongly ordered write transactions from one or more strongly ordered producer devices. The computer-executable instructions further cause the processor to issue the plurality of strongly ordered write transactions to one or more consumer devices within a weakly ordered domain. The computer-executable instructions also cause the processor to detect a first write transaction of the plurality of strongly ordered write transactions that is not accepted by a first consumer device of the one or more consumer devices. The computer-executable instructions additionally cause the processor to, for each of one or more write transactions issued subsequent to the first write transaction and accepted by a respective consumer device of the one or more consumer devices, send a cancellation message to the respective consumer device. The computer-executable instructions further cause the processor to replay the first write transaction and the one or more write transactions that were issued subsequent to the first write transaction.

DETAILED DESCRIPTION

Figure 1:
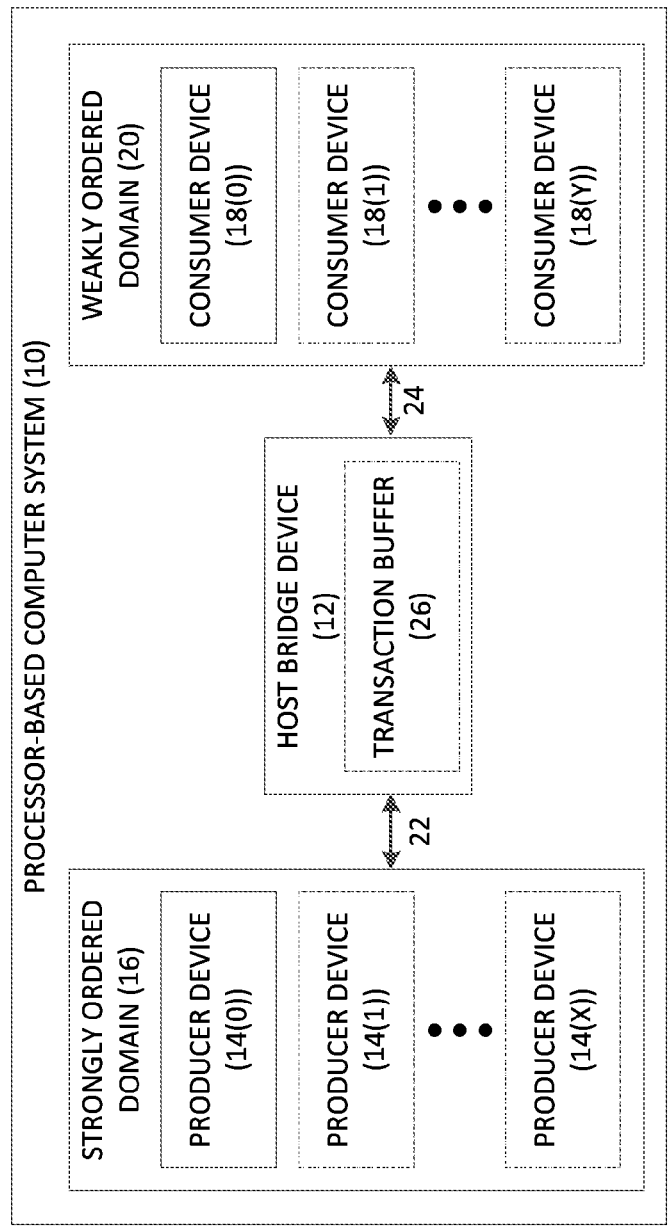
FIG. 1 is a block diagram of an exemplary processor-based computer system including a host bridge device configured to bridge strongly ordered write transactions to consumer devices in weakly ordered domains.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include bridging strongly ordered write transactions to devices in weakly ordered domains. Related devices, methods, and computer-readable media are also disclosed. In this regard, a host bridge device is configured to receive a plurality of strongly ordered write transactions from one or more strongly ordered producer devices. The host bridge device is further configured to issue the plurality of strongly ordered write transactions to one or more consumer devices within a weakly ordered domain. The host bridge device is also configured to detect a first write transaction of the plurality of strongly ordered write transactions that is not accepted by a first consumer device of the one or more consumer devices. The host bridge device is additionally configured to, for each of one or more write transactions issued subsequent to the first write transaction and accepted by a respective consumer device of the one or more consumer devices, send a cancellation message to the respective consumer device. The host bridge device is further configured to replay the first write transaction and the one or more write transactions that were issued subsequent to the first write transaction.

In this regard, FIG. 1 illustrates an exemplary processor-based computer system 10, which provides a host bridge device 12 configured to bridge strongly ordered write transactions to consumer devices in weakly ordered domains. The processor-based computer system 10 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

It is to be understood that, as used herein, a single "write transaction" in some aspects may include multiple phases. As a non-limiting example, a write transaction may include an address phase, in which the host bridge device 12 sends an address of the write transaction to a consumer device. The address phase may then be followed by a data phase in which data is sent by the host bridge device 12 for processing by a processor and/or storage by a memory device.

The processor-based computer system 10 in FIG. 1 includes one or more producer devices 14(0)-14(X) (where X≥0). Each of the one or more producer devices 14(0)-14(X) is configured to generate a series of one or strongly ordered write transactions (not shown), with the expectation that the write transactions will arrive at a destination in the same order that the write transactions were produced. Accordingly, the one or more producer devices 14(0)-14(X) may be thought of as belonging to a strongly ordered domain 16. In some aspects, the one or more producer devices 14(0)-14(X) may comprise a strongly ordered peripheral device, such as a peripheral device or interconnect that complies with the Peripheral Component Interconnect (PCI) specification.

The processor-based computer system 10 also includes one or more consumer devices 18(0)-18(Y) (where Y≥0). Each of the one or more consumer devices 18(0)-18(Y) is configured to receive a series of write transactions in an order that may be unrelated to the order in which the write transactions were produced. Thus, the one or more consumer devices 18(0)-18(Y) may be considered to reside within a weakly ordered domain 20. Some aspects may provide that the one or more consumer devices 18(0)-18(Y) may include a processor for consuming data for each write transaction and/or a memory device containing data for each write transaction.

Write transactions may be communicated from the one or more producer devices 14(0)-14(X) to the one or more consumer devices 18(0)-18(Y) via a bus interconnect, represented in FIG. 1 by bidirectional arrows 22 and 24. When one of the producer device(s) 14 in the strongly ordered domain 16 communicates a series of strongly ordered write transactions to one of the consumer device(s) 18 in the weakly ordered domain 20, all write transactions must be received before the consumer device 18 is notified that the series of write transactions are ready for consumption. However, because the order of arrival of the write transactions is not guaranteed in the weakly ordered domain 20, the consumer device 18 may receive the write transactions out of their original order, which could cause system instability due to incomplete or corrupted data.

Accordingly, to provide bridging of strongly ordered write transactions to consumer device(s) 18 in the weakly ordered domain 20, the host bridge device 12 is provided. The host bridge device 12 provides a mechanism for detecting a condition in which a write transaction is not accepted by a consumer device 18, and for cancelling and replaying the write transaction and all subsequently sent write transactions. As seen in FIG. 1, some aspects of the host bridge device 12 may include a transaction buffer 26 for storing write transactions that are received from the producer device(s) 14 and that are to be issued to the consumer device(s) 18. The transaction buffer 26 may hold write transactions that have been issued but not yet accepted by the consumer device(s) 18. The host bridge device 12 may thus ensure that the write transactions are issued in the correct order to the consumer device(s) 18 in the weakly ordered domain 20, without incurring an unacceptable system performance penalty.

Figure 2A:
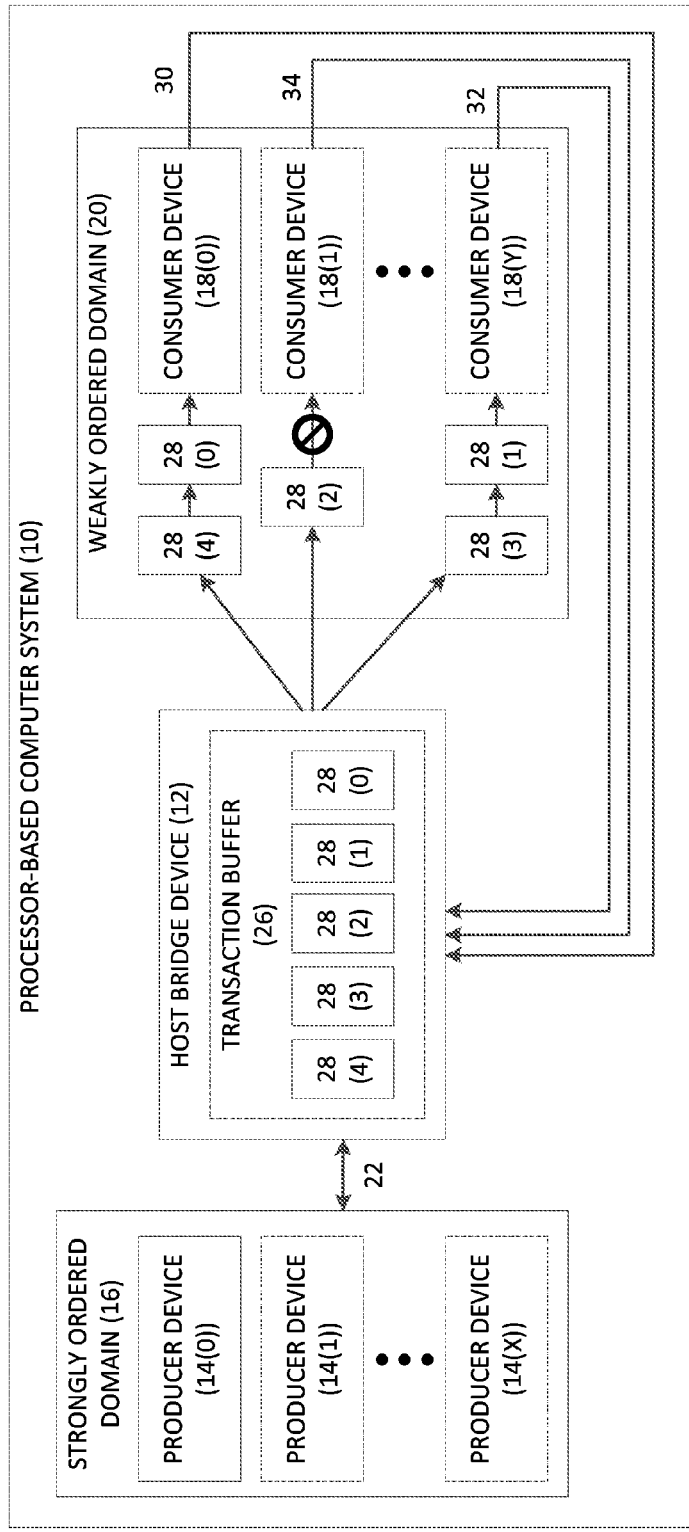
FIGS. 2A-2C are block diagrams illustrating the host bridge device of FIG. 1 issuing strongly ordered write transactions to consumer devices, detecting a write transaction that is not accepted, and canceling and replaying the write transaction and subsequent write transactions.
Figure 2B:
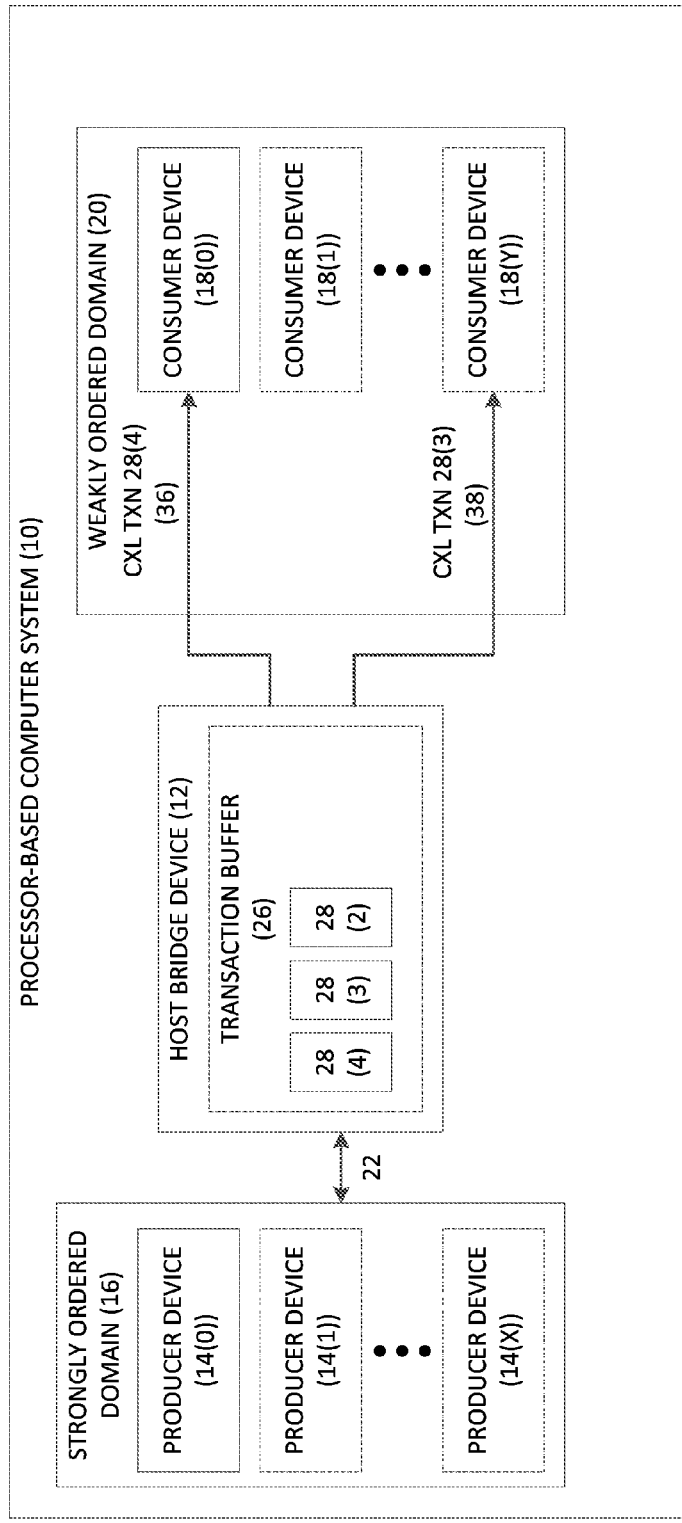
Figure 2C:
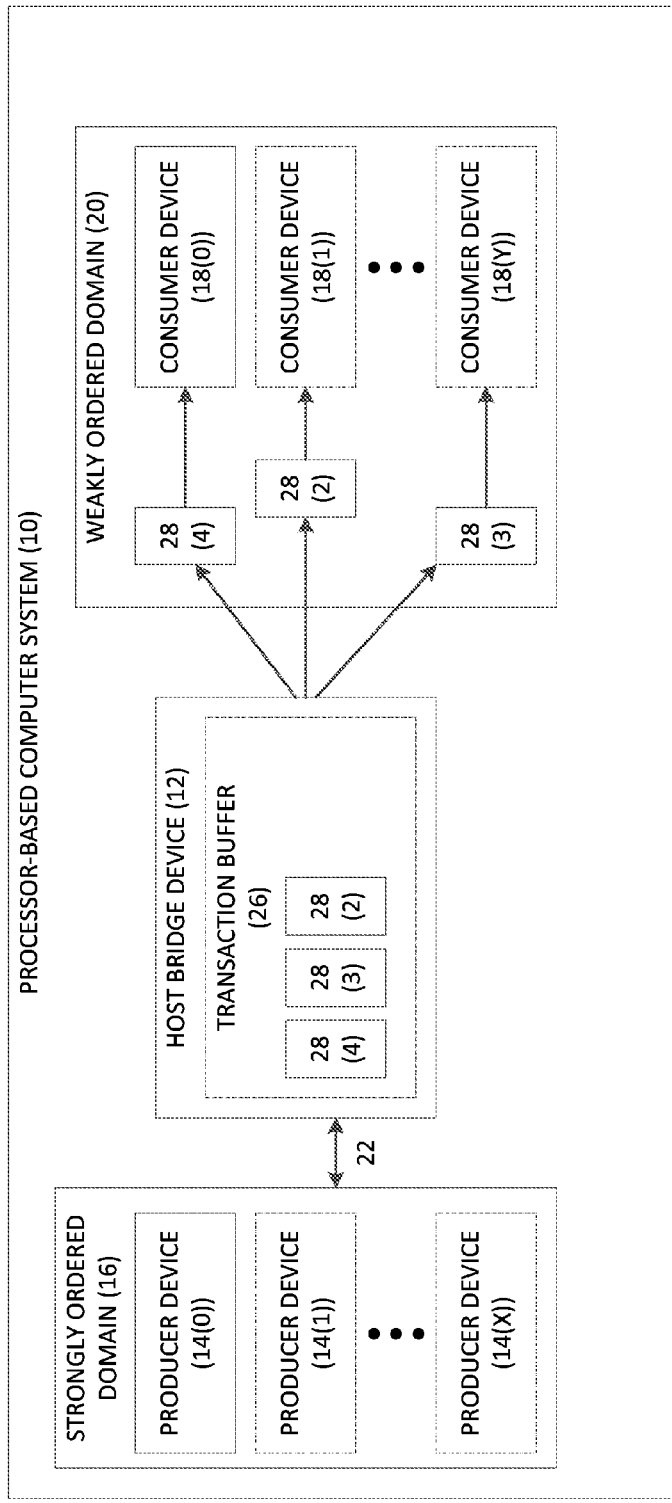

To illustrate operation of the bridging mechanism provided by the host bridge device 12 in FIG. 1, FIGS. 2A-2C are provided. FIG. 2A is a block diagram showing the host bridge device 12 of FIG. 1 issuing strongly ordered write transactions to the consumer device(s) 18 in the weakly ordered domain 20. FIG. 2B illustrates the host bridge device 12 detecting a write transaction that is not accepted, and FIG. 2C shows the host bridge device 12 canceling and replaying the write transaction and subsequent write transactions. For the sake of clarity, elements of FIG. 1 are referenced in describing FIGS. 2A-2C.

In FIG. 2A, the host bridge device 12 has received strongly ordered write transactions 28(0)-28(4) from the producer device(s) 14 in the strongly ordered domain 16 via the bus interconnect represented by bidirectional arrow 22. In this example, it is assumed that the strongly ordered write transactions 28 were issued in the following order: 28(0), 28(1), 28(2), 28(3), and 28(4). Accordingly, the specification under which the producer device(s) 14 operates provides that the strongly ordered write transactions 28 will be seen by the consumer device(s) 18 in that order.

The host bridge device 12 stores the strongly ordered write transactions 28 in the transaction buffer 26. The host bridge device 12 then issues each strongly ordered write transaction 28 to the appropriate consumer device 18 in the weakly ordered domain 20. As seen in FIG. 2A, the host bridge device 12 issues the strongly ordered write transaction 28(0) to the consumer device 18(0), and issues the strongly ordered write transaction 28(1) to the consumer device 18(Y). The host bridge device 12 further issues the strongly ordered write transaction 28(2) to the consumer device 18(1), issues the strongly ordered write transaction 28(3) to the consumer device 18(Y), and issues the strongly ordered write transaction 28(4) to the consumer device 18(0).

Because of a variety of factors (such as a communications path length, as a non-limiting example), the strongly ordered write transactions 28 may be seen by the respective consumer devices 18 in an order that does not correspond to the order in which the strongly ordered write transactions 28 were issued. The host bridge device 12 is thus configured to receive signals from the consumer devices 18(0)-18(Y), respectively, indicating a result of issuing the strongly ordered write transactions 28. In the example of FIG. 2A, acceptance responses 30 and 32 indicate acceptance of an address phase and/or a data phase of respective strongly ordered write transactions 28(0) and 28(1) by the respective consumer device 18(0) and 18(Y). In contrast, a retry response 34 sent by the consumer device 18(1) indicates that the strongly ordered write transaction 28(2) was not accepted by the consumer device 18(1). Because the strongly ordered write transaction 28(2) was not accepted while subsequent strongly ordered write transactions 28(3) and 28(4) were accepted, it is known that the strongly ordered write transactions 28 were not received in the order they were issued.

Referring now to FIG. 2B, to maintain the serialization of the strongly ordered write transactions 28, the host bridge device 12 must "undo" the strongly ordered write transactions 28(3) and 28(4) that were issued after the strongly ordered write transaction 28(2). To do so, the host bridge device 12 issues a cancellation message 36 to "cancel transaction (CXL TXN) 28(4)" to the consumer device 18(0). The cancellation message 36 indicates to the consumer device 18(0) that the previously accepted strongly ordered write transaction 28(4) should be dropped or ignored by the consumer device 18(0). In some aspects, the cancellation message 36 may comprise a request to the consumer device 18(0) to expect zero-length data. Some aspects may provide that the cancellation message 36 may comprise disabled write strobes (not shown) provided with write transaction data during a data phase of the strongly ordered write transaction 28(4). The consumer device 18(0), upon detecting that the write strobes are disabled, discards or ignores the strongly ordered write transaction 28(4).

In a similar manner, the host bridge device 12 issues a cancellation message 38 to "cancel transaction (CXL TXN) 28(3)" to the consumer device 18(Y). The cancellation message 38 indicates to the consumer device 18(Y) that the previously accepted strongly ordered write transaction 28(3) should be dropped or ignored by the consumer device 18(Y).

With continuing reference to FIG. 2B, the host bridge device 12 determines that the strongly ordered write transactions 28(0) and 28(1) of FIG. 2A were both accepted by their respective consumer devices 18(0) and 18(Y). The host bridge device 12 also determines that neither of the strongly ordered write transactions 28(0) and 28(1) of FIG. 2A is subject to a dependency (e.g., not dependent on a previously issued but unaccepted write transaction). Accordingly, in FIG. 2B, the host bridge device 12 has removed the strongly ordered write transactions 28(0) and 28(1) that were previously stored in the transaction buffer 26. In some aspects, this may free up space in the transaction buffer 26 to allow additional strongly ordered write transactions 28 to be received from the producer device(s) 14.

Turning now to FIG. 2C, the host bridge device 12 replays the strongly ordered write transaction 28(2) and the subsequent strongly ordered write transactions 28(3) and 28(4). Some aspects of the host bridge device 12 may provide that the host bridge device 12 replays the strongly ordered write transactions 28(2)-28(4) by re-issuing the strongly ordered write transaction 28(2) to the consumer device 18(1), re-issuing the strongly ordered write transaction 28(3) to the consumer device 18(Y), and re-issuing the strongly ordered write transaction 28(4) to the consumer device 18(0). In this manner, the serialization of the strongly ordered write transactions 28 in the weakly ordered domain 20 may be maintained.

Figure 3:
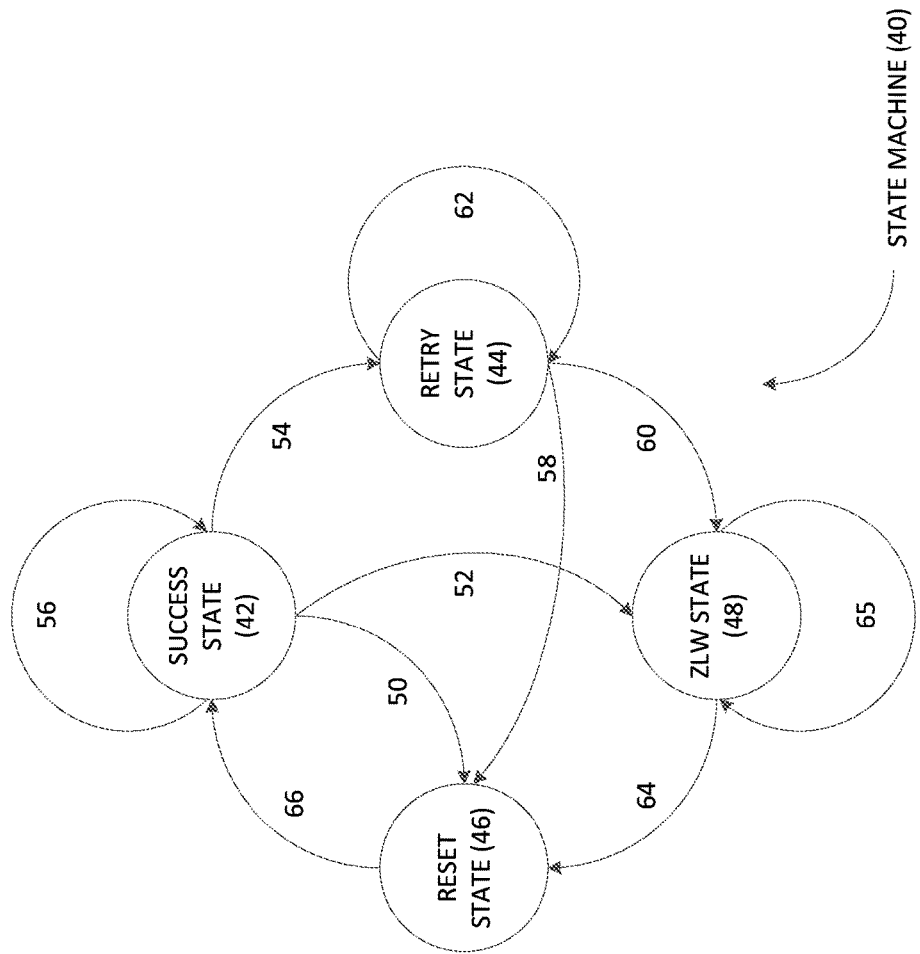
FIG. 3 is a diagram of an exemplary state machine illustrating state transitions of the host bridge device of FIG. 1.

In some aspects, the operational logic of the host bridge device 12 of FIG. 1 may include a state machine for tracking the status of each pending strongly ordered write transaction 28. In this regard, FIG. 3 shows an exemplary state machine 40 that corresponds to one of the strongly ordered write transactions 28 of FIGS. 2A-2C and that illustrates state transitions within the host bridge device 12. It is to be understood that the host bridge device 12 may maintain a plurality of state machines 40, each representing a current status of one of the strongly ordered write transactions 28. It is to be further understood that aspects of the host bridge device 12 may utilize other state machines having more, fewer, or different states than those illustrated in FIG. 3. In describing the state machine 40 of FIG. 3, elements of FIGS. 1 and 2A-2C are referenced for the sake of clarity.

The state machine 40 in FIG. 3 includes four states: a SUCCESS state 42, a RETRY state 44, a RESET state 46, and a ZERO-LENGTH WRITE (ZLW) state 48. When the host bridge device 12 allocates the state machine 40 for one of the strongly ordered write transactions 28, the state machine 40 begins by default in the SUCCESS state 42. The state machine 40 transitions out of the SUCCESS state 42 in one of the following ways:

If the strongly ordered write transaction 28 corresponding to the state machine 40 is not accepted by a respective consumer device 18, the state machine 40 transitions to the RESET state 46, as indicated by arrow 50;

If the strongly ordered write transaction 28 corresponding to the state machine 40 is accepted by a respective consumer device 18 before any preceding strongly ordered write transaction 28 is not accepted by its respective consumer device 18, the state machine 40 transitions to the ZLW state 48, as indicated by arrow 52;

If a preceding strongly ordered write transaction 28 is not accepted by its respective consumer device 18 before the strongly ordered write transaction 28 corresponding to the state machine 40 receives a response, the state machine 40 transitions to the RETRY state 44, as indicated by arrow 54;

Otherwise the state machine 40 remains in the SUCCESS state 42, as indicated by arrow 56.

The RETRY state 44 indicates that the strongly ordered write transaction 28 corresponding to the state machine 40 must be canceled and replayed. The state machine 40 may transition out of the RETRY state 44 in one of the following ways:

If the strongly ordered write transaction 28 corresponding to the state machine 40 is not accepted by a respective consumer device 18, the state machine 40 transitions to the RESET state 46, as indicated by arrow 58;

If the strongly ordered write transaction 28 corresponding to the state machine 40 is accepted by a respective consumer device 18, the state machine 40 transitions to the ZLW state 48, as indicated by arrow 60;

Otherwise the state machine 40 remains in the RETRY state 44, as indicated by arrow 62.

The ZLW state 48 indicates that the strongly ordered write transaction 28 corresponding to the state machine 40 received a successful response (e.g., in the address phase of the write transaction), but must be canceled. Consequently, the strongly ordered write transaction 28 corresponding to the state machine 40 must generate zero-byte data (e.g., in the data phase of the write transaction) and start over. The state machine 40 may transition out of the ZLW state 48 in one of the following ways:

When the strongly ordered write transaction 28 corresponding to the state machine 40 completes generating zero-byte data (not shown), the state machine 40 transitions to the RESET state 46, as indicated by arrow 64;

Otherwise, the state machine 40 remains in the ZLW state 48, as indicated by arrow 65.

The RESET state 46 causes the strongly ordered write transaction 28 corresponding to the state machine 40 to be replayed. The state machine 40 may transition out of the RESET state 46 by transitioning to the SUCCESS state 42 on a next processor clock cycle, as indicated by arrow 66.

Figure 4A:
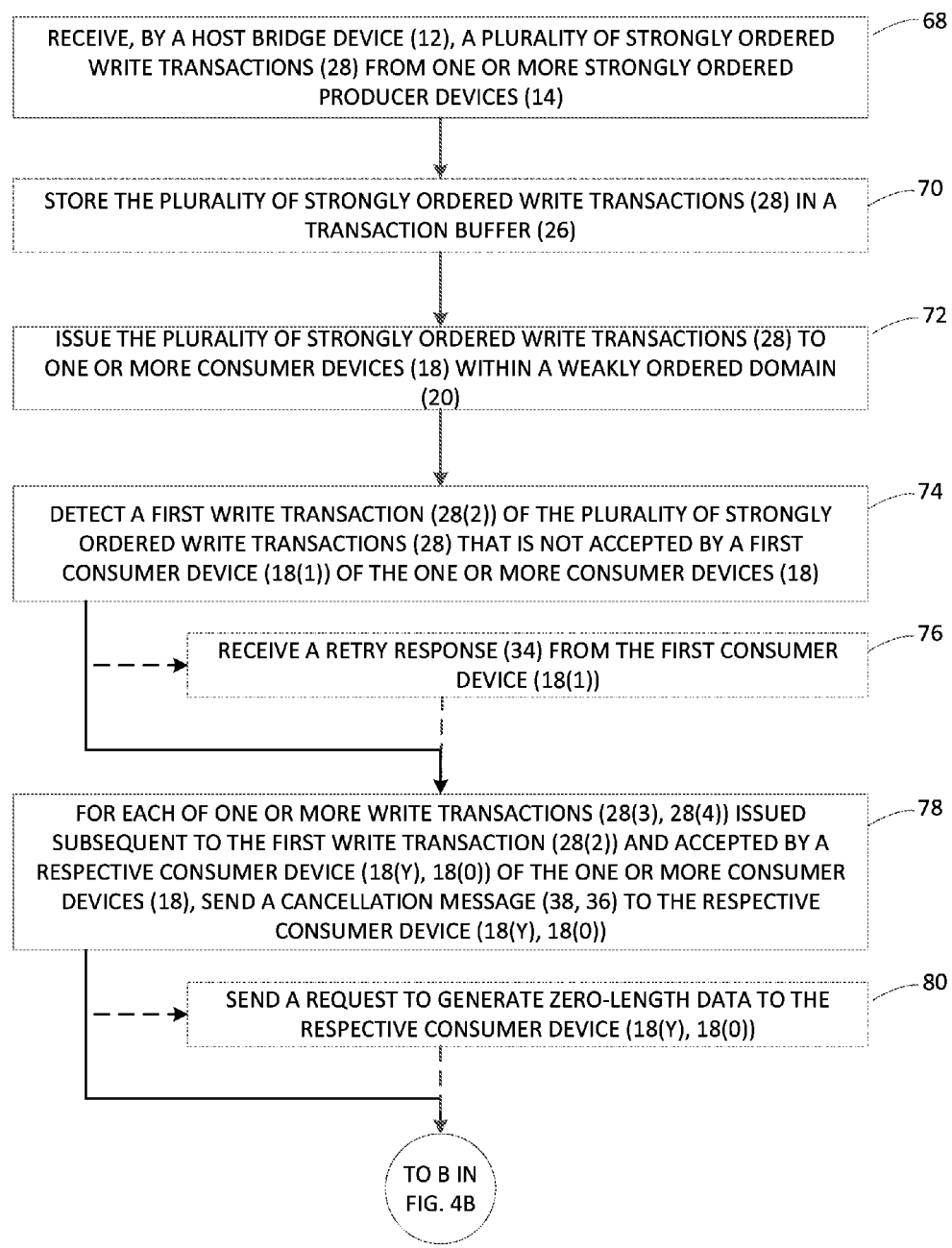
FIGS. 4A and 4B are a flowcharts illustrating an exemplary process for bridging strongly ordered write transactions to consumer devices in weakly ordered domains.
Figure 4B:
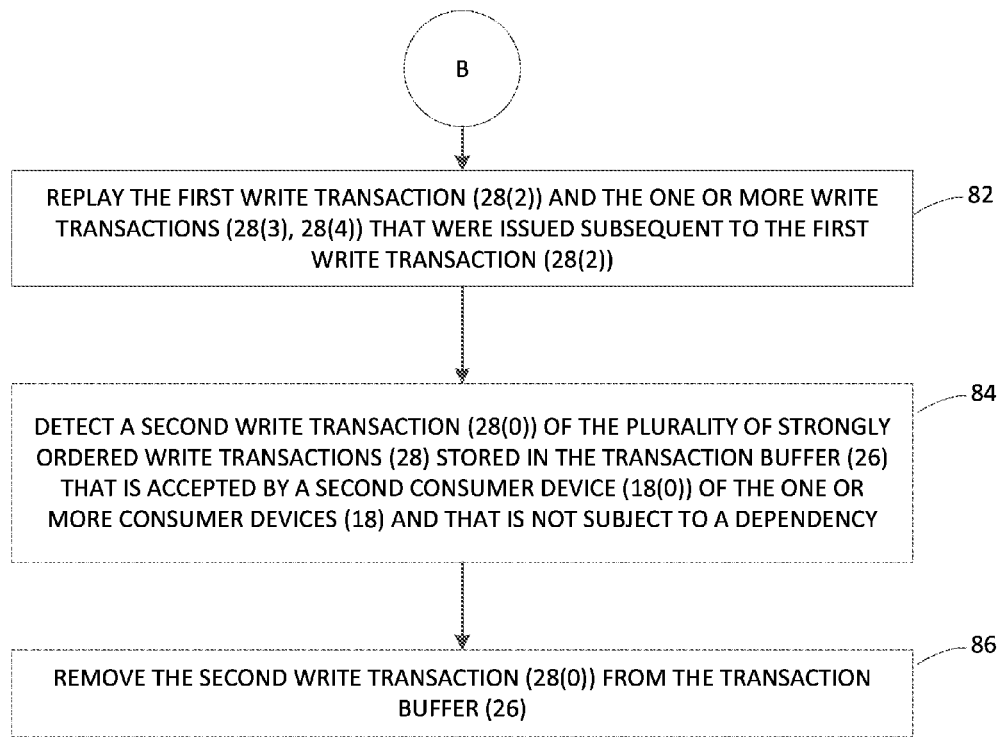

To illustrate an exemplary process for bridging strongly ordered write transactions to consumer devices in weakly ordered domains, FIGS. 4A and 4B are provided. FIG. 4A shows operations of the host bridge device 12 of FIG. 1 for receiving strongly ordered write transactions 28, issuing the strongly ordered write transactions 28 to a weakly ordered domain 20, and, if necessary, canceling the strongly ordered write transactions 28. FIG. 4B illustrates operations for replaying strongly ordered write transactions 28, and optionally clearing the transaction buffer 26 of the host bridge device 12.

In FIG. 4A, operations begin with the host bridge device 12 receiving a plurality of strongly ordered write transactions 28 from one or more strongly ordered producer devices 14 (block 68). As noted above, the producer device(s) 14 may comprise a strongly ordered memory device or peripheral device, such as a peripheral device or interconnect that complies with the PCI specification. In some aspects, the host bridge device 12 may optionally store the plurality of strongly ordered write transactions 28 in the transaction buffer 26 (block 70). The host bridge device 12 then issues the strongly ordered write transactions 28 to one or more consumer devices 18 within a weakly ordered domain 20 (block 72). The consumer device(s) 18 may comprise a weakly ordered memory device, as a non-limiting example.

The host bridge device 12 next detects a first write transaction 28(2) of the plurality of strongly ordered write transactions 28 that is not accepted by a first consumer device 18(1) of the one or more consumer devices 18 (block 74). Some aspects may provide that detecting the first write transaction 28(2) that is not accepted by the first consumer device 18(1) may include the host bridge device 12 receiving a retry response 34 from the first consumer device 18(1) (block 76). For each of one or more write transactions 28(3), 28(4) that were issued subsequent to the first write transaction 28(2) and that were accepted by a respective consumer device 18(Y), 18(0) of the one or more consumer devices 18, the host bridge device 12 sends a cancellation message 38, 36 to the respective consumer device 18(Y), 18(0) (block 78). In some aspects, the cancellation message 38, 36 may comprise a request to expect zero-length data to the respective consumer device 18(Y), 18(0) (block 80). Operations then continue at block 82 of FIG. 4B.

In FIG. 4B, the host bridge device 12 then replays the first write transaction 28(2) and the one or more write transactions 28(3), 28(4) that were issued subsequent to the first write transaction 28(2) (block 82). In this manner, serialization of the strongly ordered write transactions 28 may be maintained in the weakly ordered domain 20. Some aspects may provide that the host bridge device 12 detects a second write transaction 28(0) of the plurality of strongly ordered write transactions 28 stored in the transaction buffer 26 that is accepted by a second consumer device 18(0) of the one or more consumer devices 18 and that is not subject to a dependency (block 84). The host bridge device 12 may then remove the second write transaction 28(0) from the transaction buffer 26 (block 86).

Bridging strongly ordered write transactions to devices in weakly ordered domains according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 5:
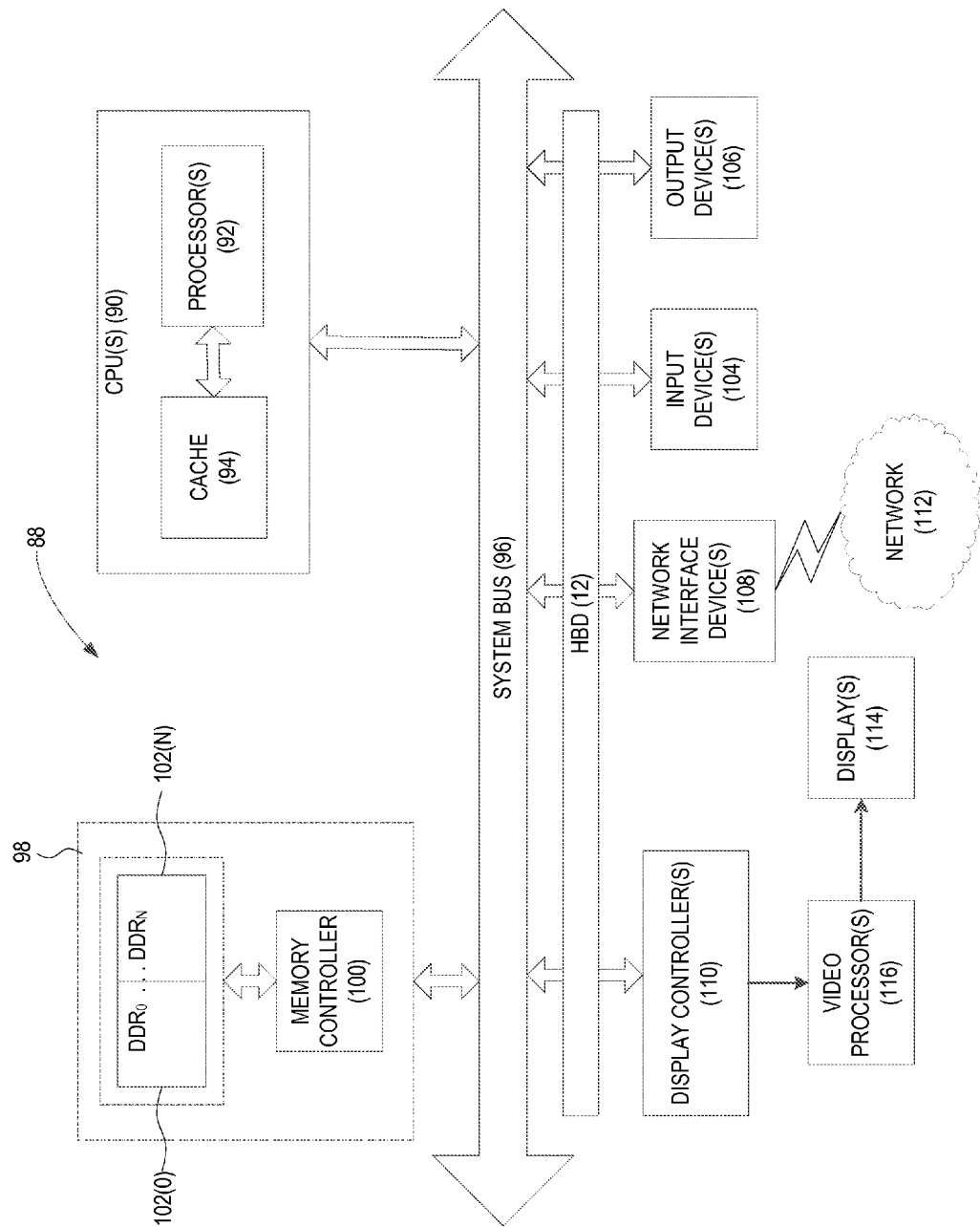
FIG. 5 is a block diagram of an exemplary processor-based system that can include the host bridge device of FIG. 1.

In this regard, FIG. 5 illustrates an example of a processor-based system 88 that can employ the host bridge device (HBD) 12 illustrated in FIG. 1. In this example, the processor-based system 88 includes one or more central processing units (CPUs) 90, each including one or more processors 92. The CPU(s) 90 may have cache memory 94 coupled to the processor(s) 92 for rapid access to temporarily stored data. The CPU(s) 90 is coupled to a system bus 96 and can intercouple master and slave devices included in the processor-based system 88. As is well known, the CPU(s) 90 communicates with these other devices by exchanging address, control, and data information over the system bus 96. For example, the CPU(s) 90 can communicate bus transaction requests to a memory system 98 that may include a memory controller 100 and one or more memory units 102(0)-102(N).

Other master and slave devices can be connected to the system bus 96. As illustrated in FIG. 5, these devices can include one or more input devices 104, one or more output devices 106, one or more network interface devices 108, and one or more display controllers 110, as examples. The input device(s) 104 can include any type of input device, including but not limited to input keys, switches, voice processors, etc. The output device(s) 106 can include any type of output device, including but not limited to audio, video, other visual indicators, etc. The network interface device(s) 108 can be any devices configured to allow exchange of data to and from a network 112. The network 112 can be any type of network, including but not limited to a wired or wireless network, a private or public network, a local area network (LAN), a wide local area network (WLAN), and the Internet. The network interface device(s) 108 can be configured to support any type of communications protocol desired.

The CPU(s) 90 may also be configured to access the display controller(s) 110 over the system bus 96 to control information sent to one or more displays 114. The display controller(s) 110 sends information to the display(s) 114 to be displayed via one or more video processors 116, which process the information to be displayed into a format suitable for the display(s) 114. The display(s) 114 can include any type of display, including but not limited to a cathode ray tube (CRT), a liquid crystal display (LCD), a plasma display, etc.

Some aspects as disclosed herein may provide that the strongly ordered domain 16 of FIG. 1 comprises one or more of the input device(s) 104, the output device(s) 106, the network interface device(s) 108, and the display controller(s) 110 of FIG. 5. The weakly ordered domain 20 of FIG. 1 may comprise the system bus 96, the memory system 98, and the CPU(s) 90 of FIG. 5. Accordingly, the host bridge device 12 may operate to provide bridging of write transactions from the devices of the strongly ordered domain 16 to the devices within the weakly ordered domain 20. As a non-limiting example, write transactions (not shown) from the input device(s) 104 to the memory system 98 may be bridged by the host bridge device 12. In this manner, the host bridge device 12 may ensure that the write transactions from the input device(s) 104 in the strongly ordered domain 16 are processed in the correct order by the memory system 98 in the weakly ordered domain 20.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An apparatus comprising a host bridge device, the host bridge device configured to:
   receive a plurality of strongly ordered write transactions from one or more strongly ordered producer devices;
   issue the plurality of strongly ordered write transactions to one or more consumer devices within a weakly ordered domain;
   detect a first write transaction of the plurality of strongly ordered write transactions that is not accepted by a first consumer device of the one or more consumer devices;
   for each of one or more write transactions issued subsequent to the first write transaction and accepted by a respective consumer device of the one or more consumer devices, send a cancellation message to the respective consumer device; and
   replay the first write transaction and the one or more write transactions that were issued subsequent to the first write transaction.

2. The apparatus of claim 1, comprising a transaction buffer configured to store the plurality of strongly ordered write transactions;
   the host bridge device configured to store the plurality of strongly ordered write transactions in the transaction buffer prior to issuing the plurality of strongly ordered write transactions to the one or more consumer devices.

3. The apparatus of claim 2, further configured to:
   detect a second write transaction of the plurality of strongly ordered write transactions stored in the transaction buffer that is accepted by a second consumer device of the one or more consumer devices and that is not subject to a dependency; and
   remove the second write transaction from the transaction buffer.

4. The apparatus of claim 1, configured to detect the first write transaction that is not accepted by the first consumer device by receiving a retry response from the first consumer device.

5. The apparatus of claim 1, configured to send the cancellation message to the respective consumer device by sending a request to expect zero-length data to the respective consumer device.

6. The apparatus of claim 1, configured to receive the plurality of strongly ordered write transactions from one or more Peripheral Component Interconnect (PCI) producer devices.

7. The apparatus of claim 1 integrated into an integrated circuit (IC).

8. The apparatus of claim 1 integrated into a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

9. An apparatus comprising a host bridge device, the host bridge device comprising:
   a means for receiving a plurality of strongly ordered write transactions from one or more strongly ordered producer devices;
   a means for issuing the plurality of strongly ordered write transactions to one or more consumer devices within a weakly ordered domain;
   a means for detecting a first write transaction of the plurality of strongly ordered write transactions that is not accepted by a first consumer device of the one or more consumer devices;
   a means for sending a cancellation message to the respective consumer device for each of one or more write transactions issued subsequent to the first write transaction and accepted by a respective consumer device of the one or more consumer devices; and
   a means for replaying the first write transaction and the one or more write transactions that were issued subsequent to the first write transaction.

10. A method for bridging strongly ordered write transactions into weakly ordered domains, comprising:
    receiving, by a host bridge device, a plurality of strongly ordered write transactions from one or more strongly ordered producer devices;
    issuing the plurality of strongly ordered write transactions to one or more consumer devices within a weakly ordered domain;
    detecting a first write transaction of the plurality of strongly ordered write transactions that is not accepted by a first consumer device of the one or more consumer devices;
    for each of one or more write transactions issued subsequent to the first write transaction and accepted by a respective consumer device of the one or more consumer devices, sending a cancellation message to the respective consumer device; and
    replaying the first write transaction and the one or more write transactions that were issued subsequent to the first write transaction.

11. The method of claim 10, further comprising storing the plurality of strongly ordered write transactions in a transaction buffer prior to issuing the plurality of strongly ordered write transactions to the one or more consumer devices.

12. The method of claim 11, further comprising:
    detecting a second write transaction of the plurality of strongly ordered write transactions stored in the transaction buffer that is accepted by a second consumer device of the one or more consumer devices and that is not subject to a dependency; and
    removing the second write transaction from the transaction buffer.

13. The method of claim 10, wherein detecting the first write transaction that is not accepted by the first consumer device comprises receiving a retry response from the first consumer device.

14. The method of claim 10, wherein sending the cancellation message to the respective consumer device comprises sending a request to expect zero-length data to the respective consumer device.

15. The method of claim 10, wherein receiving the plurality of strongly ordered write transactions from the one or more strongly ordered producer devices comprises receiving the plurality of strongly ordered write transactions from one or more Peripheral Component Interconnect (PCI) producer devices.

16. A non-transitory computer-readable medium having stored thereon computer-executable instructions to cause a processor to:
    receive a plurality of strongly ordered write transactions from one or more strongly ordered producer devices;
    issue the plurality of strongly ordered write transactions to one or more consumer devices within a weakly ordered domain;
    detect a first write transaction of the plurality of strongly ordered write transactions that is not accepted by a first consumer device of the one or more consumer devices;
    for each of one or more write transactions issued subsequent to the first write transaction and accepted by a respective consumer device of the one or more consumer devices, send a cancellation message to the respective consumer device; and
    replay the first write transaction and the one or more write transactions that were issued subsequent to the first write transaction.

17. The non-transitory computer-readable medium of claim 16 having stored thereon the computer-executable instructions to further cause the processor to store the plurality of strongly ordered write transactions in a transaction buffer prior to issuing the plurality of strongly ordered write transactions to the one or more consumer devices.

18. The non-transitory computer-readable medium of claim 17 having stored thereon the computer-executable instructions to further cause the processor to:
    detect a second write transaction of the plurality of strongly ordered write transactions stored in the transaction buffer that is accepted by a second consumer device of the one or more consumer devices and that is not subject to a dependency; and
    remove the second write transaction from the transaction buffer.

19. The non-transitory computer-readable medium of claim 16 having stored thereon the computer-executable instructions to cause the processor to detect the first write transaction that is not accepted by the first consumer device by receiving a retry response from the first consumer device.

20. The non-transitory computer-readable medium of claim 16 having stored thereon the computer-executable instructions to cause the processor to send the cancellation message to the respective consumer device by sending a request to expect zero-length data to the respective consumer device.

* * * * *